July 17, 1934.  J. RAYNER  1,966,520
ART OF THREADED FASTENING
Filed Sept. 10, 1930
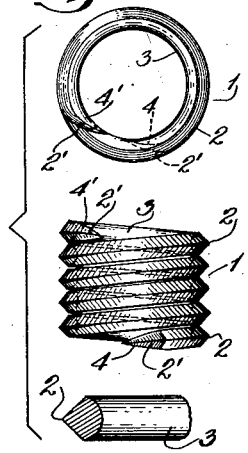
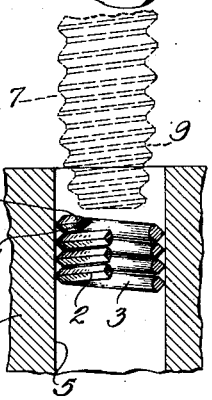
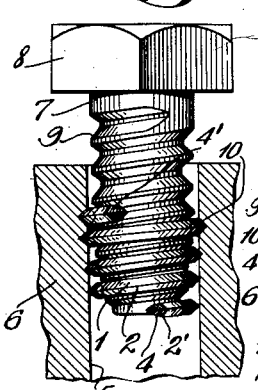
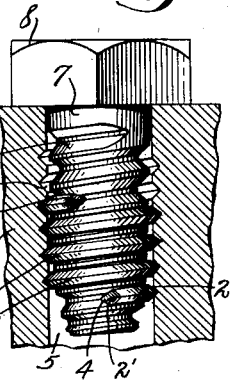
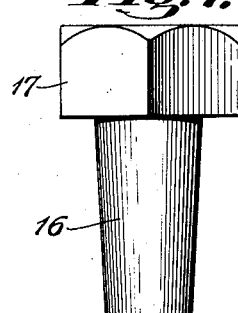
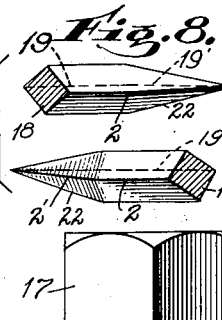
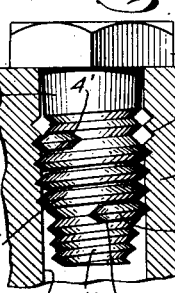
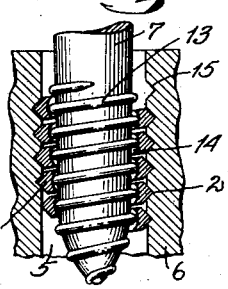
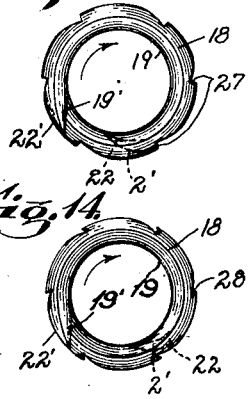
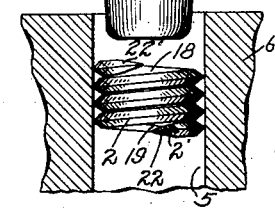
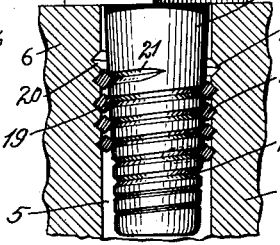
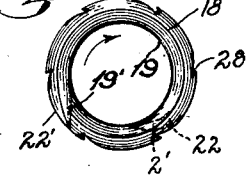
INVENTOR.
John Rayner
BY Jeffery, Kimball & Eggleston
ATTORNEYS.

Patented July 17, 1934

1,966,520

UNITED STATES PATENT OFFICE 1,966,520

ART OF THREADED FASTENING

John Rayner, Jersey City, N. J.

Application September 10, 1930, Serial No. 480,863

12 Claims. (Cl. 85—2)

The invention relates to the art of threaded fastening and includes both the method and the means of fastening parts together by cutting a thread in one or both of them as hereinafter set forth.

The method will be described in connection with the description of the means which is a fastening or anchoring device of wide utility where a fixture or other part, or parts, of metal, wood or other material is to be secured to, or in, another part of the same or different material as metal, wood, masonry, bakelite, etc. In the case of metals it is expensive, and in the case of a material like brick or cement, it is very difficult to tap an internal thread for the reception of a screw or bolt. The instant method and device may be employed with advantage in connecting such materials including those which like hardwood cement, bakelite, etc., are brittle or subject to splitting, and those which have a tendency to crumble, as well as for fastening together any parts of various other materials including relatively soft metal, such as soft iron, soft steel, brass, aluminum die castings, etc. The present device employs a thread-cutting coil spring having an external cutting edge, or both an external and an internal cutting edge, and is further distinguished from expansion bolts and other known fastening devices in that such spring is free for relative progressive movement with respect to the parts to be secured together. The spring not only cuts the thread but engages it and is thus the means of fastening the parts together.

Referring to the drawing:

Fig. 1 shows in plan, elevation and detail section, a thread-cutting coil spring having an external cutting edge and designed for use with a threaded expander;

Figs. 2, 3 and 4 are central longitudinal sections showing the parts of this form of the device in successive positions, portions being broken away and the entering expander being shown phantom in Fig. 2;

Fig. 5 is a central longitudinal section corresponding to Fig. 4 but showing an expander whose screw thread is of the same pitch as that of the spring;

Fig. 6 is a central longitudinal section showing a rolled lag screw thread on the expander and a coil spring of special section cooperating therewith, parts being broken away;

Fig. 7 is a central longitudinal section showing an unthreaded expander about to be inserted into a coil spring having both an external and an internal cutting edge, portions of the member having the bore being broken away as in other figures;

Fig. 8 is a detail cross-section of the respective tapered ends of the spring of Fig. 7;

Fig. 9 corresponds to Fig. 7, but shows the expander turned home and the consequent screw threading both of the bore and of the expander;

Fig. 10 is a central longitudinal section corresponding generally to Fig. 9, but showing a coil spring having an internal multi-thread cutting edge;

Fig. 11 is a central longitudinal section showing a coil spring having an external instead of an internal multi-thread cutting edge;

Fig. 12 is a detail cross section through a spring having external and internal multi-thread-cutting edges; and Figs. 13 and 14 are plan views of coil springs having retaining cross notches in their external cutting edges.

The active thread cutting and engaging element of which the method avails itself and which is essentially characteristic of the device is a coil spring of cold drawn steel wire or other suitable material of desired section, wound into a right or left handed coil of any selected pitch and having one or more cutting edges. In the form shown in Fig. 1 this spring 1 has an external cutting edge 2 and a thread-engaging edge or side surface 3. In order to facilitate the advance of the spring its leading end 4 is preferably tapered, the cutting edge 2 terminating in a gentle gradual slope 2' away from the surface to be threaded so that the cutting edge enters the material gradually making a shallow cut subsequently deepened and widened to the full dimensions of the thread by the spring proper. The inclined part of the cutting edge may as shown in Fig. 1, extend to the edge 3. This inclined thread-starting-and-locating end of the cutting edge minimizes distortion and increases the accuracy of the thread cutting operation. The other end 4' of the spring may also be tapered and the edge 2 similarly inclined. This thread-cutting member may be placed partly or, preferably, completely within the bore 5 drilled or otherwise produced in the part 6, portions of which are broken away and which may be a wall, block, tie, sleeve, tube or other structure, or article, as the case may be, having a hole to receive the spring and which may be of material appropriate to such article. The spring which is ordinarily and preferably of the same external diameter and of the same internal diameter throughout is of a size to snugly fit the bore so as to be lightly frictionally held therein. The expander, shown in Figs. 2, 3 and 4 as a tapered bolt 7 of metal or other suitable material having a head 8 and externally threaded in the same sense as the spring, may have a thread corresponding to that of the spring or of any other desired form and of equal or greater pitch. It is illustrated as having a thread 9 of greater pitch than the spring. This expander is advanced into the spring and turned, whereupon the spring first adjusts itself to the threads of the bolt which are brought into contact with the inside of the spring and is then expanded against the wall of the bore until the pressure is sufficient to bind the spring to the screw, when further turning of the bolt causes the spring to turn with reference to the bore and to advance therein. The spring thus becomes in effect an expansion of the thread of the bolt being, in the figures referred to, expanded axially as well as outward by the thread 9, which, by virtue of its greater pitch, correspondingly separates adjacent spires of the spring. The expander thread also acts as a guide for the spring both spirally and axially. In the movement of the spring thus produced its external cutting edge as it travels in the wall of the bore cuts a gradually deepening thread 10 therein. As shown in Fig. 4 etc., wherein the entire coil before the thread cutting begins is pushed or dropped completely into the bore with its rear end below or beyond the adjacent end of the bore, this thread may be started below the mouth of the bore, thus avoiding injury to the face of the part containing the bore. Positions of the parts after the entry of the bolt into the spring are illustrated in Figs. 3 and 4, wherein the progress of the bolt through the spring until its head is turned home, as well as the advance of the spring in the bore is made apparent. The spring is now firmly fixed in the bore and constitutes a permanent thread for the bolt.

In the foregoing description, and in general throughout this specification, the expander is described as the part which is turned, i. e., the driving member, and that is usually the case, but it is to be understood that, where its nature permits, the part having the bore may be the one turned, as in the case of a sleeve, tube, or etc. Rotation would then be in reverse direction i. e. counter threadwise.

The extensibility and elasticity of the spring enable it to accommodate itself to threads of various forms and of any pitch not less than its own. These characteristics also make it unnecessary that the spring itself, the thread on the plug or the threads cut by the spring should be mathematically exact or of any prescribed standard. This is a matter of considerable importance, since the screw thread standards of different countries vary widely, whereas a wire may readily be coiled into a spring anywhere. As the coil springs can be very cheaply produced, and, where desired, given a hard cutting edge or edges by known processes at slight expense, the cost is much lessened as compared with devices in which the parts are threaded in the usual way and to the degree of accuracy required between rigid threaded male and female members.

The fastening device shown in Fig. 5, is similar to that of Fig. 4, except that the pitch of the thread 11 on the expander bolt is the same as the pitch of the spring so that the latter though slightly expanded owing to the taper of the expander is not greatly distorted but cuts a thread 12 on the bore of substantially the same pitch as the spring.

In the device of Fig. 6, the bolt is a rolled lag screw having the usual thread 13 to which the concave inner side 14 of the spring of special section adapts itself.

In all these forms of the device, as well as in others hereinafter described, the spring having cut the thread continues to resiliently engage and grip it and retains itself in place in the bore, and the expander, whatever its nature whether bolt, fixture, or other part, may be repeatedly inserted and removed without impairing the connection which is much stronger than that obtained in the ordinary expansion bolt by merely crushing the intermediate shield into the surrounding material.

The method of fastening parts together by screw-threading one or both of them which constitutes a part of applicant's invention should be clear from examination of the drawing and from what has already been said, and it is further set forth in the method claims which indicate its scope. It may be said, however, to consist in drilling or otherwise producing a bore in one of the parts, (assuming the absence of a bore), snugly fitting in said bore a coil spring having an external cutting edge, expanding said spring against the wall of the bore, and producing relative rotation and axial progression between said spring and said bore and thereby causing the cutting edge to screw-thread the bore and secure the parts together. Where a device of the type shown in the figures already described is used in carrying out the method, it may be further characterized as including conforming the inside or guiding edge of the spring to a guide-thread. This method may also include expanding the spring axially as well as outward. It is ordinarily most convenient to place the spring in the bore and expand it by inserting a tapered member into the spring and advancing and turning it with respect thereto, but the spring might be introduced on the end of the expanding member.

In the forms of the device thus far described, the expander is externally screw threaded. It is simpler, cheaper and frequently preferable, however, not to screw thread in advance either the bore or the expander but to employ with the unthreaded tapered expander 16, 17, which may be of round, square or other cross section, a thread cutting spring 18 as in Figs. 7, 8 and 9, having in addition to the external cutting edge 2 an internal cutting edge 19. These edges during the application of the unthreaded expander cut internal and external threads in the bore wall and in the external surface of the expander, as indicated in Fig. 9, at 20 and 21, respectively. In these figures, the active cutting edge at each end of the spring, both of which ends are leading, is inclined gently away from the surface to be threaded to the other cutting edge as indicated at 2' and 19', the external cutting edge sloping inward and the internal cutting edge sloping outward. The tapered ends are indicated respectively by 22 and 22' in Figs. 7 and 8. The expander may be turned in the direction of the thread of the spring to the extent desired, or until its head 17 seats against the opposed face of the other part adjacent the bore, or against a plate or other member designed to be secured thereto by the fastening device. It will be understood that, in order to meet requirements as to form, strength etc. imposed by particular conditions, the cross section of the spring may be altered at will, the cutting edge or edges being retained. The square (or diamond) cross section, shown in Figs. 7–9, is for various purposes satisfactory. This form of the device which cuts a thread in each of the parts is particularly useful where, owing to differences in the nature of the material, or for other reasons, it is desired to produce threads of different form or pitch, or of both different form and pitch on the respective parts. Differing spring sections of this type are illustrated in Figs. 10, 11 and 12. In Fig. 10, the spring has a single exterior cutting edge 2 and a multi-thread cutting edge 23, in this case double. The thread cut by edge 2 is indicated by 20 as in Fig. 9, and that cut by edge 23 by 24. In this figure the head 17 of the expander secures a member 25 to the face of the other part. It should be made plain that the type of the device in which threads are cut by the spring on both the parts, is not restricted to use where the expander is of softer material than the part having the bore. On the contrary, the device has also been successfully employed to thread and fasten together a wooden block having a smooth bore and an unthreaded tapered expander of soft steel. Where the parts are made of particularly hard material, it may be desirable to cut multiple threads on both of them and so obtain for a lesser depth of tooth the same area of contact between the cutting edges. Where one of the materials is softer than the other, its resistance to relative rotation of the spring may be increased by using a spring having external or internal multiple cutting edges opposed to that part. The single internal cutting edge in Fig. 11 is indicated by 19 as in Figs. 7, 8 and 9, and the double external cutting edge by the numeral 26. The multi-thread-cutting edges in Fig. 12 are indicated as in Figs. 10 and 11, respectively, by the numeral 23 for the internal and 26 for the external.

The method of fastening two parts together by screw-threading both of them is similar to the method described earlier in the specification. Its nature will be apparent from what has just been said in connection with the type of the fastening device shown in Figs. 7 et seq. It may, however, be said to consist in locating in snugly fitting relation with the bore of one part and with an expanding portion of the other part, usually initially unthreaded, a coil spring having an external cutting edge and an internal cutting edge, expanding the spring against the wall of the bore, and producing relative rotation and axial progression between said spring and each of said parts and thereby causing said cutting edges to screw thread both said parts and secure them together. The character both of the bore and of the expander is definitely changed by carrying out this method.

In all forms of the device illustrated a further turn of the expander serves to tighten the connection. This is particularly advantageous where the fastening is subject to vibration which would naturally tend to loosen it, as is the case, for example, where the device is used for securing heavy parts of machinery to floors.

Figs. 13 and 14 show the use of cross grooves or notches 27 interrupting the cutting edge of the spring and providing transverse rearwardly facing surfaces tending to obstruct or prevent backing off of the spring, but not interfering with its advance rotation. The surface of the face of the notch on the far or advance side thereof is made more abrupt than the rear face, or the notches are undercut or hook-shaped, as shown at 28 in Fig. 14. Material crowded into the notches locks the spring against reverse movement. Notching of the cutting edge is seldom required, except where the springs are subjected to severe conditions tending to back them out of the bore, as where undue force is used in releasing the expander or where force is inexpertly applied to it, or where the material of the part having the bore is not of a character to admit of being gripped by the spring sufficiently strongly to eliminate all risk of reverse movement.

I claim:—

1. A thread-cutting fastening device comprising a part having therein a bore, a coil spring snugly fitting the bore and free for relative rotation and axial movement with respect thereto and having an external cutting edge and an internal cutting edge, and an initially externally unthreaded expander within said spring capable of relative rotation with respect to the spring and with respect to the bore to cause expansion of the spring against the wall of the bore and its relative turning and axial advance with reference thereto so that the respective cutting edges of the spring cut an internal thread in the wall of the bore and an external thread on the expander, engage said threads and thereby fasten the parts together.

2. The method of fastening one part in the bore of another which consists in locating in snugly fitting relation with the bore and with an externally unthreaded expanding portion of the other and internal part a coil spring having an external cutting edge and an internal cutting edge, expanding the spring against the wall of the bore, and producing relative rotation and axial progression between said spring and each of said parts and thereby causing said cutting edges to cut screw threads in the opposed surfaces of both said parts with which they are respectively in contact and secure them together.

3. A thread-cutting fastening device comprising a part having therein a bore, a coil spring permanently located in the bore and free for axial advance with respect to the bore, and an expander plug extending within the spring and relatively rotatable with respect to the bore, said spring having an external cutting edge and an internal cutting edge lying respectively in the surface of the wall of the bore and in the surface of the expander respectively opposed thereto, said spring being subject to axial travel and to endwise relative progression of its cutting edges in said respective opposed surfaces on continued relative rotation of said bore member and plug member, said members being separable and re-engageable and said spring constituting a permanent metal thread for the plug member.

4. A thread-cutting and engaging fastening device comprising a part having therein a bore, an expander and a coil spring between the expander and the wall of the bore and having an angular cutting edge engaging a thread cut by said edge in the wall of the bore, said cutting edge occupying a part only of said thread and leaving unoccupied the portion of the thread between the rear end of the spring and the adjacent end of the bore, and an internal cutting edge engaging a thread cut by it in the expander.

5. A thread-cutting and engaging fastening device comprising a part having therein a bore, an expander and a coil spring between the expander and the wall of the bore, said spring being wholly within the bore with its rear end at a distance from the adjacent end of the bore and having an external angular cutting edge, the wall of the bore having a thread beginning at a distance from the said end of the bore, cut in the wall of the bore by the said cutting edge of the spring, engaged by said cutting edge, and having an unoccupied portion behind the spring.

6. A thread-cutting and engaging fastening devices as set forth in claim 4, in which the coil spring is frictionally related to both the wall of the bore and the expander member and has the sectional contour of its external cutting edge different from the corresponding sectional contour of its internal cutting edge, whereby the respective threads cut by the coil spring in the wall of the bore and in the expander are different.

7. In a thread-cutting fastening device, a coil spring adapted for one way rotation and having a cutting edge provided with rearwardly opening undercut notches extending across the same and presenting transverse rearwardly facing surfaces for obstructing backing off movement on reverse rotation of the coil, but presenting no obstruction to forward rotation.

8. The method of fastening parts together which consists in producing a bore in one of them, placing the whole of a coil spring having an external angular cutting edge into the bore without injury to the wall of the bore and with the rear end of the spring at a distance from the adjacent open end of the bore, thereafter expanding said spring against the wall of the bore into cutting relation thereto, and continuing to expand it progressively outward while in cutting contact with the wall surface of the bore and causing the coil spring to rotate and advance axially in the bore and its cutting edge to travel endwise in said wall as it is being expanded outward thereinto and thus cut a gradually deepening internal thread in the wall of the bore.

9. The method of fastening one part in a bore in another part which consists in interiorly conforming to an external guide thread on said first mentioned part, a coil spring having an external angular cutting edge in contact with the wall of the bore, at the same time progressively expanding said edge against said wall and producing relative rotation and axial progression between said contacting spring and bore and thereby causing relative endwise travel of said cutting edge in the wall of the bore to progressively cut a screw thread in the wall of the bore and secure the parts together.

10. A thread-cutting and engaging fastening device comprising a part having therein a bore, an externally screw-threaded expander bolt, and an intermediate coil spring securing said parts together and having an external cutting edges engaging a thread cut by it in the wall of the bore, said cutting edge occupying a part only of said thread and leaving unoccupied the portion of the thread between the rear end of the spring and the adjacent end of the bore, and an internal guiding edge engaging the external thread of the expander bolt.

11. A thread-cutting and engaging fastening device as set forth in claim 10, in which the cutting edge of the spring is of different contour from that of the thread of the expander bolt and until conformed to said thread also of different pitch therefrom.

12. A thread-cutting and engaging fastening device comprising a part therein having a bore, a coil spring snugly fitting the bore and having an external angular cutting edge, an expander extended within the spring, the expander and spring being capable of relative rotation, and the spring being capable of relative rotation with respect to the part having the bore and of endwise advance of its cutting edge in the wall of the bore, whereby, on relative rotation of the expander and the member having the bore, the spring cuts and engages a thread in the wall of the bore and fastens the parts together.

JOHN RAYNER,